United States Patent

Meek

[15] 3,666,808

[45] May 30, 1972

[54] SUBSTITUTED NITROSALICYLANILIDES

[72] Inventor: William H. Meek, Northfield, Ohio

[73] Assignee: Ferro Corporation, Cleveland, Ohio

[22] Filed: Feb. 9, 1970

[21] Appl. No.: 9,981

[52] U.S. Cl. ..........................................260/559 S, 424/324
[51] Int. Cl. ........................................................C07c 103/26
[58] Field of Search ...............................................260/559 S

[56] References Cited

UNITED STATES PATENTS

| | | | |
|---|---|---|---|
| 3,079,297 | 2/1963 | Schraufstatter et al. | 260/559 S |
| 3,147,300 | 9/1964 | Schraufstatter et al. | 260/559 S |
| 3,375,160 | 3/1968 | Early et al. | 260/559 S |

Primary Examiner—Henry R. Jiles
Assistant Examiner—S. D. Winters
Attorney—Milton L. Simmons

[57] ABSTRACT

The compounds disclosed herein are defined by the formula

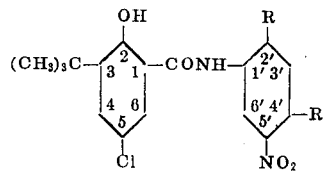

wherein R is hydrogen or methyl. These compounds are found to be particularly useful as bacteriostats, as lamprecides and as differential fish toxicants. The compounds are found to be particularly effective for such purposes because of the nitro group in the 5' position and because of the tertiarybutyl group in the 3 position.

5 Claims, No Drawings

SUBSTITUTED NITROSALICYLANILIDES

BACKGROUND OF THE INVENTION

1. Field of the Invention

The present invention relates to substituted nitrosalicylanilides. More specifically, it relates to substituted nitrosalicylanilides having a nitro group in the 5' position and a tertiary-butyl group in the 3 position, preferably with a methyl radical in the 2' position.

2. Description of the Related Prior Art

A number of substituted nitrosalicylanilides are disclosed in the prior art. For example, Schraufstatter et al U. S. Pat. Nos. 3,029,297 and 3,147,300 disclose a number of nitrosalicylanilides in which the nitro groups are in the 2' and 4' positions and also have chlorine in the 5 position, and in some cases chlorine in the 2' position. These compounds are described as being very active gastropodicidal agents. In such compounds, the nitro groups are in the 4' position or 2' position.

SUMMARY OF THE INVENTION

In accordance with the present invention, it has now been found that nitrosalicylanilides having a nitro group in the 5' position and a tertiary-butyl radical in the 3 position, together with chlorine in the 5 position and methyl or hydrogen in the 2' and 4' positions, give compounds which are very effective as bacteriostats, lamprecides and differential fish toxicants. These new compounds are found to be much more effective for such purposes than corresponding compounds which have the nitro group in the 4' position or a position other than the 5' position and which do not have the tertiary-butyl group. The compounds of this invention can be represented by the formula

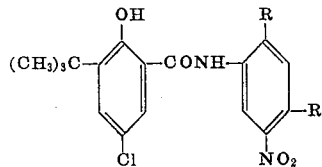

wherein R is methyl or hydrogen.

When there is no substituent group in the 2' position, the nitro group can be referred to as either in the 5' or 3' position. However, since nomenclature rules require use of the lowest possible number, this is referred to as the 3' nitro instead of the 5' nitro derivative. While it is preferred to have the methyl substituent group in the 2' position, it is also effective to have methyl in the 4' position or in both the 2' and the 4' positions.

The compounds of this invention can be prepared by reacting 3-tertiary-butyl-5-chloro-salicylic acid with meta-nitroaniline, or a substituted derivative thereof having a methyl radical in the 6 and/or 4 position. These derivatives can also be referred to as 2-methyl-5-nitroaniline or 4-methyl-5-nitroaniline, etc. The reaction is advantageously conducted in the presence of a dehydrating agent and in the presence of an inert solvent, such as chlorobenzene and tetrachloroethane.

At temperatures of 60° C. to about 150° C., the reaction is completed in 1 to 8 hours, the reaction proceeding more quickly at the higher temperatures. Dehydrating agents are preferably used, such as PCl₃ and SOCl₂.

These compounds can also be prepared by reacting the appropriate substituted salicyloyl chloride with meta-nitroaniline or appropriate derivative. The temperature advantageously is 5°–60° C. and reaction is substantially completed in ½ to 3 hours.

This reaction is also advantageously conducted in an inert solvent such as chlorobenzene, tetrachloroethane, pyridine and N,N-dimethylamides, e.g., dimethylformamide, dimethylacetamide and dimethylpropionamide.

Where the preparation is effected in solution, the product is recovered by precipitation and filtration. The product can be precipitated from the reaction medium by the addition of methyl alcohol.

Typical compounds of this invention include:
3-tert.butyl-5-chloro-2'-methyl-5'-nitrosalicylanilide
3-tert.butyl-5-chloro-3'-nitrosalicylanilide
3-tert.butyl-5-chloro-4'-methyl-5'-nitrosalicylanilide
3-tert.butyl-5-chloro-2',4'-dimethyl-5'-nitrosalicylanilide.

The compounds of this invention are particularly useful as lamprecides. These compounds are particularly effective in that the compounds are unharmful to trout when used in amounts as high as 4 times that found sufficient to kill the lamprey larva.

These compounds are also found to be toxic to less desirable fish such as carp, and non-toxic to more desirable fish such as blue gill in doses that are sufficient to kill the carp. In evaluating differential fish toxicity, the test is similar to that used in the lamprey tests, except that each test is conducted with 10 specimens of the individual species, and the tests are conducted in fresh water at about 12° C.

In conducting bacteriostat tests, the following procedure is used: the test compounds are dissolved in a suitable solvent (typically dimethylformamide) and incorporated in nutrient agar (for bacteria) or Sabouraud agar (for fungi) at various concentrations. The plates are then streaked with cultures of various bacteria or fungi. After incubation for 48 hours at 37° C. (for bacteria) or for one week at 25° C. (for fungi), the plates are examined for evidence of growth of these organisms. The minimum concentration necessary for complete inhibition of growth is recorded.

The organisms tested are:
*Staphylococcus aureus*, a Gram-positive bacterium common on the human skin, and responsible for certain infections and for objectionable odor-forming reactions;
*Escherichia coli* and Pseudomonas aeruginosa, two Gram-negative bacteria capable of causing serious secondary and occasionally primary infections; and
*Aspergillus Niger* and Penicillium citrinum, two fungi typical of forms which grow on foods, and on some synthetic surface coatings.

All are either economically important per se, or are used as experimental indicators of the growth pattern of related more dangerous organisms.

The lamprey test used herein is essentially that described in circular 185 of the Bureau of Sports Fisheries and Wildlife, U. S. Department of the Interior (1964). In these tests Lake Huron water is used, and a test period of 24 hours and a water temperature of 55° F. are also used. In each case two lampreys and two rainbow trout are used.

The optimum concentrations for the use of the compounds of this invention will vary somewhat according to the temperature, pH, etc. For controlling lamprey the effective concentration is advantageously in the range of 0.03 to 1 part per million. The compound is added in liquid form as a solution, suspension or emulsion. Such procedures are also discussed in U.S. Pat. No. 2,821,499. The concentration of toxicant for actual use will vary depending upon temperature, pH of the water, types of food and game fish. Optimum concentrations are preferably determined experimentally by laboratory tests simulating conditions of contemplated use.

The invention is illustrated by the following examples. These examples are given merely for illustrative purposes and are not intended to limit the scope of the invention nor the manner in which it may be practiced. Unless indicated otherwise, parts and percentages are given by weight.

EXAMPLE I 3-t-Butyl-5-chloro-2'-methyl-5'-nitrosalicylanilide

To a 500 milliliter reaction flask equipped with stirrer, thermometer, condenser and drying tube positioned at the top of the condenser, there is added 68.7 grams of 3-t-butyl-5-chloro-salicylic acid, 49.4 grams of 2-methyl-5-nitroaniline, 13.8 grams of PCl₃ and 400 ml. of chlorobenzene. The resultant mixture is heated at reflux temperature for 2 hours. Then the hot solution is filtered and allowed to cool to room temperature. The precipitate is recovered by filtration and recrystallized from chlorobenzene to give 3-t-butyl-5-chloro-2'-methyl-5'-nitrosalicylanilide in a 50 percent yield with a melting point of 160°–4° C.

EXAMPLE II 3-t-Butyl-5-chloro-3'-nitrosalicylanilide

The procedure of Example I is repeated using an equivalent amount of meta-nitroaniline in place of the substituted nitroaniline of Example I, and 45.6 grams (43.6 percent theoretical) of the desired product are obtained with a melting point of 158°–160° C.

EXAMPLE III

The procedure of Example I is repeated twice using in one case an equivalent amount of 4-methyl-3-nitroaniline and in the other case an equivalent amount of 2,4-dimethyl-3-nitroaniline in place of the substituted nitroaniline of Example I to give 3-t-butyl-5-chloro-4-methyl-3'-nitroaniline and 3-t-butyl-5-chloro-2,4-dimethyl-5'-nitroaniline.

EXAMPLE IV

A number of tests are carried out in 10-liter glass jars (10-inch diameter) each containing 6 liters of test solution. The jars are aerated by means of standard stone air breakers to maintain oxygen levels at near saturation. The temperature is maintained constant at 55° F. by immersion of the test jars in a water bath maintained at that temperature. The test animals range from about 3 to 5 inches in length and comprise larvae of the sea lamprey (*Petromyzon marinus*) and fingerline rainbow trout (*Salmo gairdneri*). The animals are allowed to become acclimated to the temperature of the test solution, and then appropriate amounts of the toxicant, dissolved in a solvent such as dimethylformamide, are added to produce the desired concentrations. The following Table I shows the results of tests using the compounds of Example I and II and the excellent results produced thereby.

TABLE I 3-t-Butyl-5-chloro-2'-methyl-5'-nitrosalicylanilide

| Concentration in parts per million | Lampreys | | Rainbow Trout | |
|---|---|---|---|---|
| | Number of test animals | Mortality (percent of total test animals) | Number of test animals | Mortality (percent of total test animals) |
| 0.3 | 2 | 100% | 2 | 0% |
| 0.1 | 2 | 100% | 2 | 0% |
| 0.07 | 2 | 100% | 2 | 0% |

It can be seen from the above data that the compounds are not only selective toward lamprey larva, but are unusually effective at very minor amounts.

EXAMPLE V

The procedure of Example IV is repeated a number of times using the compounds of Examples I and II as well as the corresponding compounds in which the nitro group is in the 4'-position instead of the 5'-position. In each case the maximum tolerable concentration is determined for trout, and the minimum lethal concentration is determined for lamprey. The ratio of maximum tolerable concentration for trout/minimum lethal concentration for lamprey is expressed as the ratio T/L. The values of these ratios are determined for each of these compounds and are given below in Table II.

TABLE II

| Name of Compound | T/L |
|---|---|
| 3-t-Butyl-5-chloro-2'-methyl-5'-nitrosalicylanilide | 3 |
| 3-t-Butyl-5-chloro-3'-nitrosalicylanilide | 3 |
| 3-t-Butyl-5-chloro-4'-nitrosalicylanilide | 1.5 |
| 5-chloro-3'-nitrosalicylanilide | 1.0 |

The last compound has no t-butyl group, and the results show that the presence of the t-butyl group increases the T/L ration from 1.0 to 3.

EXAMPLE VI

Comparative tests are made between the compound of Example I and the corresponding compound in which the nitro group is in the 4' position instead of the 5' position. These tests are conducted as described above for determining the minimum inhibitory concentration (M.I.C.) against Staphylococcus aureus. The 5'-nitro derivative is found to be much more effective.

EXAMPLE VII

The same compounds used in Example VI are tested as differential fish toxicants using the conditions described above for this purpose and running the tests for 96 hours. The 5'-nitro compound of Example I is found much superior compared to its counterpart in which the nitro group is present in the 4' position. The compound of Example I kills all carp at a concentration of 0.1 ppm and at the same concentration will kill no blue gill in the 96 hour test period. In contrast, while the counterpart compound having the nitro group in the 4' position kills all carp at 0.1 ppm, at the same time it kills 10 percent of the blue gill.

Similar effective results are obtained when the compounds of Example III are used in the tests of Examples IV, VI and VII.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A compound having the formula

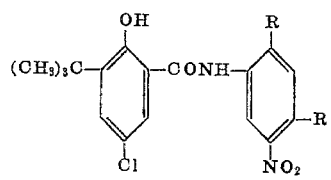

wherein R is H or $CH_3$.

2. The compound of claim 1 comprising 3-tertiary-butyl-5-chloro-2'-methyl-5'-nitrosalicylanilide.

3. The compound of claim 1 comprising 3-tertiary-butyl-5-chloro-3'-nitrosalicylanilide.

4. The compound of claim 1 comprising 3-tertiary-butyl-5-chloro-2',4'-dimethyl-5'-nitrosalicylanilide.

5. The compound of claim 1 comprising 3-tertiary-butyl-5-chloro-4'-methyl-5'-nitrosalicylanilide.

* * * * *